(12) United States Patent
Yamamoto

(10) Patent No.: US 7,268,510 B2
(45) Date of Patent: Sep. 11, 2007

(54) CONTROL APPARATUS FOR OPEN/CLOSE MEMBER AND METHOD FOR CONTROLLING OPEN/CLOSE MEMBER

(75) Inventor: Motoya Yamamoto, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 451 days.

(21) Appl. No.: 11/027,485

(22) Filed: Dec. 28, 2004

(65) Prior Publication Data

US 2005/0212473 A1 Sep. 29, 2005

(30) Foreign Application Priority Data

Jan. 5, 2004 (JP) ............... 2004-000482
Dec. 17, 2004 (JP) ............... 2004-366563

(51) Int. Cl.
*H02P 3/00* (2006.01)
(52) U.S. Cl. ............ 318/466; 318/369; 318/280; 318/282; 318/286
(58) Field of Classification Search ........ 318/466, 318/286, 369, 461, 280, 282
See application file for complete search history.

(56) References Cited

U.S. PATENT DOCUMENTS 3,624,473 A * 11/1971 Robbins ............ 318/266
4,831,509 A * 5/1989 Jones et al. ............ 700/90
5,410,226 A * 4/1995 Sekiguchi et al. ...... 318/266
5,585,705 A * 12/1996 Brieden ............ 318/467
6,794,837 B1 * 9/2004 Whinnery et al. ...... 318/282

FOREIGN PATENT DOCUMENTS

| JP | 08-331877 | 12/1996 |
|---|---|---|
| JP | 2000-184780 | 6/2000 |
| JP | 2001-078488 | 3/2001 |

* cited by examiner

*Primary Examiner*—Rita Leykin
(74) *Attorney, Agent, or Firm*—Patterson, Thuente, Skaar & Christensen, P.A.

(57) ABSTRACT

A controller writes position information (count value) of the window glass into an EEPROM based on halting of operation of a drive motor and identifies the current position of the window glass based on the position information of the window glass written in the EEPROM at the start of power supply. The controller determines whether the current position of the window glass has been lost or not at the start of power supply. Only when the controller determines that the current position of the window glass has been lost at the start of power supply, the controller shifts to a mode of performing relearning of the origin position for matching the position of the window glass with the position of the window glass corresponding to the position information written into the EEPROM.

28 Claims, 8 Drawing Sheets

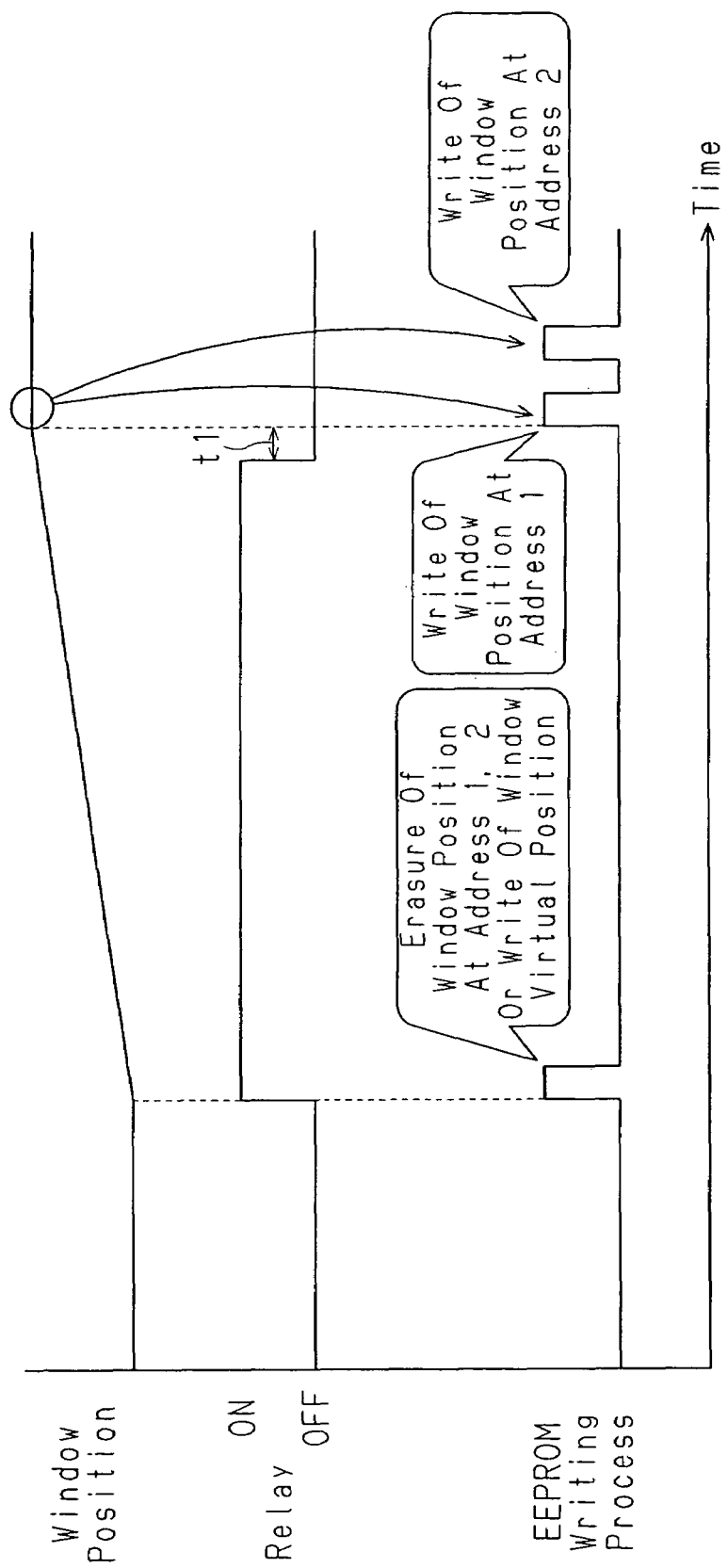

CONTROL APPARATUS FOR OPEN/CLOSE MEMBER AND METHOD FOR CONTROLLING OPEN/CLOSE MEMBER

BACKGROUND OF THE INVENTION

The present invention relates to a control apparatus and method for controlling an open/close member such as a power window apparatus which opens and closes a window glass of a vehicle and sunroof apparatus which opens and closes a roof glass of a vehicle.

A motor used as a drive source of a power window apparatus for a vehicle is generally provided with a motor body and a reduction gear mechanism that reduces the rotation speed of the motor body and outputs the reduced rotation, with the motor body and reduction gear mechanism assembled as one body. This motor outputs a pulse signal synchronized with the rotation of a rotation shaft of the motor body to a controller. The controller detects the position of a window glass by counting edges of the pulse signal and detects the rotation speed of the motor body based on the period of the pulse signal. Since the window glass is opened and closed by driving the motor, the controller is provided with a function for preventing the window glass from trapping foreign matter. When the rotation speed of the motor body decreases extensively within the range of a count value for determining the presence or absence of trapped matter during the closing operation for the window glass, this trapping prevention function determines that the rotation speed of the motor body has been reduced because foreign matter is trapped in the window glass. Then, the trapping prevention function drives the motor body backward to open the window glass by a predetermined amount so as to release the trapped foreign matter.

In order not to misidentify the current position of the actual window glass when the supplied drive power is shut off, the controller writes position information of the window glass into an electrically rewritable (erasable) ROM such as EEPROM built in the controller at a predetermined timing.

For example, the controller disclosed in Japanese Laid-Open Patent Publication No. 8-331877 writes position information of the window glass into a ROM after lapse of a predetermined time after a command for a motor is changed from an operation command to a stop command or after stoppage of the motor is confirmed. Furthermore, when the supply voltage falls below a predetermined value for more than a predetermined time, the controller writes the position information of the window glass into the ROM after lapse of a predetermined time or after stoppage of the motor is confirmed. Furthermore, when it is determined that torque equal to or greater than a predetermined value is output for a predetermined time or more, the controller writes the position information of the window glass into the ROM. Furthermore, when a command for the motor is a stop command, the controller writes the position information of the window glass into the ROM every time after lapse of a certain time.

However, in the case of the apparatus described in Japanese Laid-Open Patent Publication No. 8-331877, when the power supply to the controller is stopped before the position information of the window glass is written into the ROM during operation of the window glass (when the motor is in operation) and the power supply is restarted, the current position of the actual window glass has moved from the position of the window glass corresponding to the position information written in the ROM. That is, the current position of the window glass is different from the position of the window glass corresponding to the position information written in the ROM. For this reason, the controller misidentifies the current position of the window glass, which causes trouble with control of the motor. Therefore, the apparatus in Japanese Laid-Open Patent Publication No. 8-331877 is not considered as one that contemplates the case where the power supply to the controller is stopped before the position information of the window glass is written into the ROM during operation of the window glass.

Thus, in the above described case, it is necessary to perform relearning of the origin position to match the actual window glass position with the position of the window glass corresponding to the position information written into the ROM. Thus, it is possible to perform relearning of the origin position for all cases where the power supply to the controller is stopped and the power supply is restarted.

However, the relearning of the origin position involves a complicated operation which requires a manual operation by an operator such as operating the window glass up to mechanical limit positions such as a fully open position or fully closed position and operating predetermined switches. Furthermore, when the window glass is stopped (when the motor is stopped), even if the power supply to the controller is stopped and then restarted, the current position of the actual window glass matches the position of the window glass corresponding to the position information written in the ROM. Thus, the controller identifies the current position of the window glass correctly and there is no trouble with the control of the motor, and therefore there is no need to perform relearning of the origin position. On the other hand, when relearning of the origin position is performed for all cases where the power supply to the controller is stopped and then restarted, the relearning of the origin position needs to be performed even when there is no need to perform relearning of the origin position as described above.

SUMMARY OF THE INVENTION

It is an object of the present invention to provide a control apparatus and method for controlling an open/close member capable of reducing the frequency with which relearning of the origin position is performed, which is a complicated operation.

In order to attain the above described object, the present invention provides a control apparatus for an open/close member. The apparatus is provided with a drive motor, position detection means, storage means, control means and determination means. The drive motor is driven so as to open and close a open/close member. The position detection means detects the position of the open/close member. The storage means is made of an electrically rewritable ROM and position information corresponding to the position of the detected open/close member is written into the storage means. The control means writes the current position information of the open/close member into the storage means based on halting of operation of the drive motor and identifies the current position of the open/close member at the start of a power supply based on the position information of the open/close member written in the storage means. The determination means determines whether the control means has lost the current position of the open/close member or not at the start of the power supply.

The present invention also provides a method for controlling an open/close member. The method includes writing the position information corresponding to the position of the detected open/close member into a storage means, identifying the current position of the open/close member by the control means and determining whether the current position of the open/close member is lost or not. The writing into the storage means is writing position information corresponding to the detected position of the open/close member into the storage means made of an electrically rewritable ROM based on the halting of operation of the drive motor which opens and closes the open/close member. The identifying the current position of the open/close member by control means is identifying the current position of the open/close member by control means at the start of the power supply based on the current position information of the open/close member written in the storage means. The determining whether the control means has lost the current position of the open/close member or not is determining whether the control means has lost the current position of the open/close member or not at the start of the power supply.

Other aspects and advantages of the invention will become apparent from the following description, taken in conjunction with the accompanying drawings, illustrating by way of example the principles of the invention.

BRIEF DESCRIPTION OF THE DRAWINGS

Seemingly new features of the present invention will become more apparent particularly in the claims attached thereto. The present invention accompanied by its objects and advantages will be understood with explanation of preferable embodiments of the present shown below with reference to the attached drawings.

FIG. 11 is a timing chart illustrating the position storage process.

DETAILED DESCRIPTION OF THE PREFERRED EMBODIMENTS

A first embodiment which embodies the present invention in a power window apparatus for a vehicle will be explained with reference to drawings below.

Figure 1:
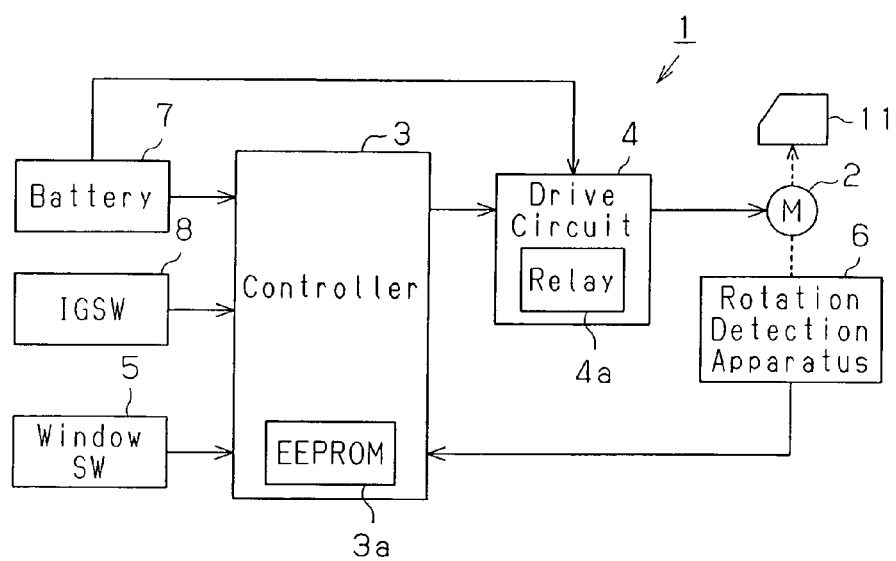
FIG. 1 is a block diagram showing the electrical structure of a power window apparatus for a vehicle according to a first embodiment.
Figure 2:
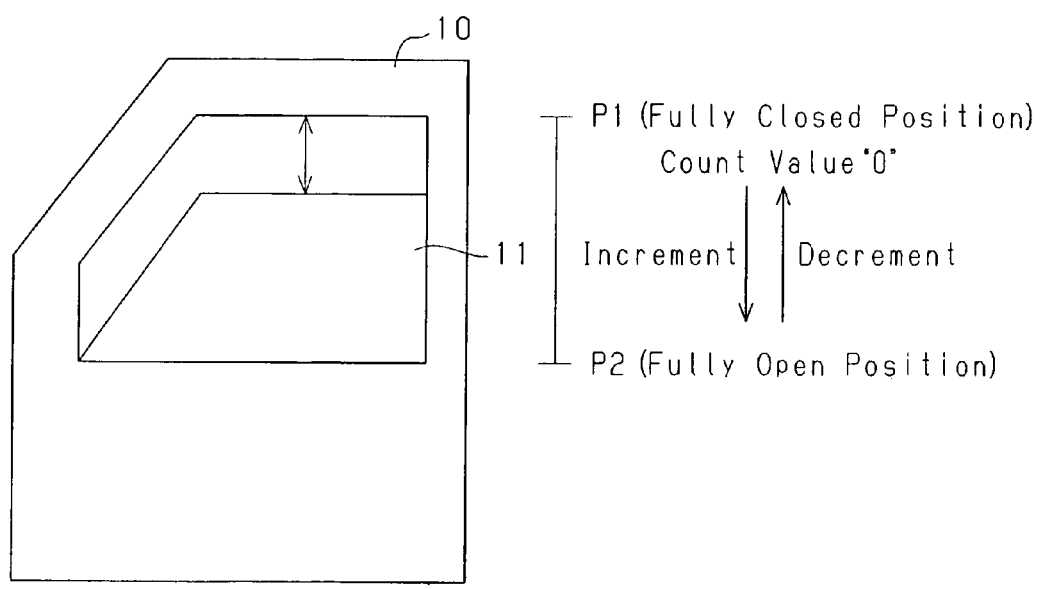
FIG. 2 is a schematic view of a door.

FIG. 1 is a block diagram showing the electrical structure of a power window apparatus 1 for a vehicle according to this embodiment. The power window apparatus 1 moves up and down (opens and closes) window glasses 11 which are disposed as open/close members on side doors 10 of a vehicle shown in FIG. 2 by rotary drive of a drive motor 2. The power window apparatus 1 is provided with the drive motor 2, a controller 3, a drive circuit 4, a window switch (window SW) 5 and a rotation detection apparatus 6. The controller 3 constitutes position detection means, control means and determination means. The rotation detection apparatus 6 constitutes position detection means. The respective components of the power window apparatus 1 are disposed at predetermined locations of the vehicle. The controller 3 is supplied with power necessary for operation from a battery 7 mounted on the vehicle and the drive circuit 4 is supplied with power necessary to drive the drive motor 2 from the battery 7. The controller 3 is supplied with power necessary for operation from the battery 7 based on an ON signal of an ignition switch (IGSW) 8 provided for the vehicle. In this embodiment, the ignition switch 8 is not connected in series between the battery 7 and controller 3 and the controller 3 is designed to receive a power supply from the battery 7 based on an ON signal of the ignition switch 8.

The drive motor 2 is supplied with drive power from the drive circuit 4 under the control of the controller 3 and moves up/down (opens and closes) the window glass 11 through a window regulator (not shown). The drive motor 2 is constructed of a motor body and a reduction gear mechanism integral therewith for reducing the rotation of the motor body and outputting the reduced rotation. This drive motor 2 includes a rotation detection apparatus 6 integral therewith for detecting the rotation speed of a rotation shaft of the motor body as the rotation speed of the drive motor 2. The rotation detection apparatus 6 acquires a pulse signal synchronized with the rotation of the rotation shaft of the drive motor 2 and outputs the pulse signal to the controller 3. The rotation detection apparatus 6 includes, for example, two Hall devices and is designed to output pulse signals synchronized with the rotation of the rotation shaft of the drive motor 2 and produce a predetermined phase difference between the pulse signals.

The controller 3 detects the rotation speed of the drive motor 2 based on the length of the period of a pulse signal input and detects the rotation direction of the drive motor 2 based on the phase difference between the respective pulse signals. That is, the controller 3 detects the operating speed of the window glass 11 based on the rotation speed of the drive motor 2 and detects the operating direction of the window glass 11 based on the rotation direction of the drive motor 2. The controller 3 carries out counting based on edges of pulse signals and detects the position of the window glass 11 in the range from a fully closed position P1 to a fully open position P2 of the window glass 11 based on the count value. The count value at the fully closed position P1 of the window glass 11 is set to "0" and the count value is incremented through an opening action toward the fully open direction of the window glass 11. On the contrary, the count value is decremented during the closing operation of the window glass 11 and the count value becomes "0" again at the fully closed position P1 of the window glass 11.

The controller 3 receives various command signals to open/close (move up/down) the window glass 11 from the window switch 5. The window switch 5 is operated so as to operate the window glass 11 to open/close within a range from the fully closed position P1 to the fully open position P2. The window switch 5 is constructed, for example, of a rocker type switch that can be operated in, for example, two stages, provided with an open switch, close switch and auto switch.

More specifically, when one end of the window switch 5 is operated in one stage, the open switch is turned ON. Then, the window switch 5 outputs a normal open command signal to normally open the window glass 11, that is, to open the window glass 11 as long as the window switch 5 is operated, to the controller 3. When the other end of the window switch 5 is operated in one stage, the close switch is turned ON. The window switch 5 outputs a normal close command signal to normally close the window glass 11, that is, to close the window glass 11 as long as the window switch 5 is operated, to the controller 3. When the one end of the window switch 5 is operated in two stages, both the open switch and auto switch are turned ON. Then, the window switch 5 outputs an auto open command signal to automatically open the window glass 11, that is, an auto open command signal to open the window glass 11 up to the fully open position P2 even if the operation of the window switch 5 is stopped, to the controller 3. When the other end of the window switch 5 is operated in two stages, both the close switch and auto switch are turned ON. Then, the window switch 5 outputs an auto close command signal to automatically close the window glass 11, that is, an auto close command signal to close the window glass 11 up to the fully closed position P1 even if the operation of the window switch 5 is stopped, to the controller 3.

When the controller 3 receives a normal open command signal from the window switch 5, it drives the drive motor 2 through the drive circuit 4 so as to normally open the window glass 11 as long as the command signal is input, that is, as long as the window switch 5 is operated. Thus, the window glass 11 is normally opened. Based on the above described count value, if the window glass 11 has reached the fully open position P2, the controller 3 stops the drive motor 2 even if the window switch 5 is operated. When the controller 3 receives a normal close command signal from the window switch 5, it drives the drive motor 2 through the drive circuit 4 so as to normally close the window glass 11 as long as the command signal is input, that is, as long as the window switch 5 is operated. Therefore, the window glass 11 is normally closed. Based on the above described count value, if the window glass 11 has reached the fully closed position P1, the controller 3 stops the drive motor 2 even if the window switch 5 is operated. When the controller 3 receives an auto open command signal from the window switch 5, it drives the drive motor 2 through the drive circuit 4 so as to automatically open the window glass 11 up to the fully open position P2 based on the above described count value. Therefore, the window glass 11 is automatically opened up to the fully open position P2. When the controller 3 receives an auto close command signal from the window switch 5, it drives the drive motor 2 through the drive circuit 4 so as to automatically close the window glass 11 up to the fully closed position P1 based on the above described count value. Therefore, the window glass 11 is automatically closed up to the fully closed position P1.

When the window glass 11 is in a closing operation (normal closing operation and auto closing operation), the controller 3 determines the presence/absence of trapped foreign matter by the window glass 11. The presence/absence of trapped foreign matter is determined in a predetermined trap area based on a count value and the determination on the presence/absence of trapped matter is canceled in a predetermined count value area in the vicinity of the fully closed position P1. When trapping of foreign matter by the window glass 11 occurs, the operating speed of the window glass 11, that is, the rotation speed of the drive motor 2 decreases. The controller 3 is monitoring for variation in the rotation speed of the drive motor 2 all the time. Then, when the variation in the rotation speed when the rotation speed of the drive motor 2 is reduced exceeds a predetermined threshold, the controller 3 determines that trapping of foreign matter has occurred. Based on the determination, the controller 3 reverse the rotation of the drive motor 2 so as to release the foreign matter trapped by the window glass 11 and opens the window glass 11 by a predetermined amount (predetermined count value). When the controller 3 determines that trapping of foreign matter has occurred, the controller 3 may also stop the operation of the drive motor 2 and stop further closing operation of the window glass 11.

In order to identify the current position of the actual window glass 11, the controller 3 writes the count value (position information) corresponding to the current position of the window glass 11 into an EEPROM 3a as storage means provided inside the controller 3. As is commonly known, the EEPROM 3a is an electrically rewritable (erasable) ROM. The controller 3 writes this count value at a timing at which the drive motor 2 is changed from an operating state to a halt state. After the drive motor 2 is changed from an operating state to a halt state and writing of the count value into the EEPROM 3a is completed, the controller 3 writes data indicating an OFF state (halt state) as the startup information of the drive motor 2 into the EEPROM 3a. Furthermore, at a timing at which the drive motor 2 is changed from a halt state to an operating state, the controller 3 writes data indicating an ON state (operating state) as the startup information of the drive motor 2 into the EEPROM 3a. The process of writing data into the EEPROM 3a will be referred to as the "position storage process."

When the power supply to the controller 3 itself is started when power is turned ON or when the battery 7 is replaced, etc., the controller 3 reads the count value written in the EEPROM 3a and recognizes the current position of the window glass 11. In this case, the controller 3 determines whether the count value written in the EEPROM 3a is an accurate value or not and determines whether or not to perform relearning of the origin position. The relearning of the origin position is performed for the purpose of matching the current position of the actual window glass 11 with the position of the window glass 11 corresponding to the count value written in the EEPROM 3a. This relearning of the origin position is performed by operating the window glass 11 up to the fully closed mechanical limit position, operating the window switch 5 and resetting the count value corresponding to the position of the window glass 11 to "0". When the startup information of the drive motor 2 written in the EEPROM 3a indicates an OFF state, the controller 3 determines that it is not necessary to perform relearning of the origin position, whereas when the startup information indicates an ON state, the controller 3 determines that it is necessary to perform relearning of the origin position. The process of determining whether or not to perform relearning of the origin position when power is turned ON will be referred to as the "process at power-up."

More specifically, that an ON state of the drive motor 2 has been written in the EEPROM 3a when the power supply to the controller 3 is started means that the drive motor 2 was in operation when the power supply to the controller 3 was stopped. Therefore, the current position of the actual window glass 11 has moved from the position of the window glass 11 corresponding to the count value written in the EEPROM 3a and the current position of the window glass 11 is different from the position of the window glass 11 corresponding to the count value written in the EEPROM 3a. Thus, the controller 3 misidentifies the current position of the window glass 11, that is, the controller 3 has lost the current position of the window glass 11, which causes trouble with control of the drive motor 2. In this way, in the case where an ON state of the drive motor 2 has been written in the EEPROM 3a when the power supply to the controller 3 is started, the controller 3 determines that it is necessary to perform relearning of the origin position. Once this determination is made, the controller 3 shifts to an inching mode, which prompts the passenger (operator) for relearning of the origin position, that is, a mode in which the window glass 11 will not operate more than a predetermined amount (predetermined count value) by a single operation of the window switch 5.

On the other hand, that an OFF state of the drive motor 2 has been written in the EEPROM 3a when the power supply to the controller 3 is started means that the drive motor 2 was in a halt state when the power supply to the controller 3 was stopped. Therefore, the current position of the window glass 11 matches the position of the window glass 11 corresponding to the count value written in the EEPROM 3a. Therefore, the controller 3 identifies the current position of the window glass 11 accurately and determines that it is not necessary to perform relearning of the origin position. Thus, the controller 3 shifts to a normal operation processing mode in which the normal operation process on the window glass 11 according to the operation of the window switch 5 is performed.

Figure 3:
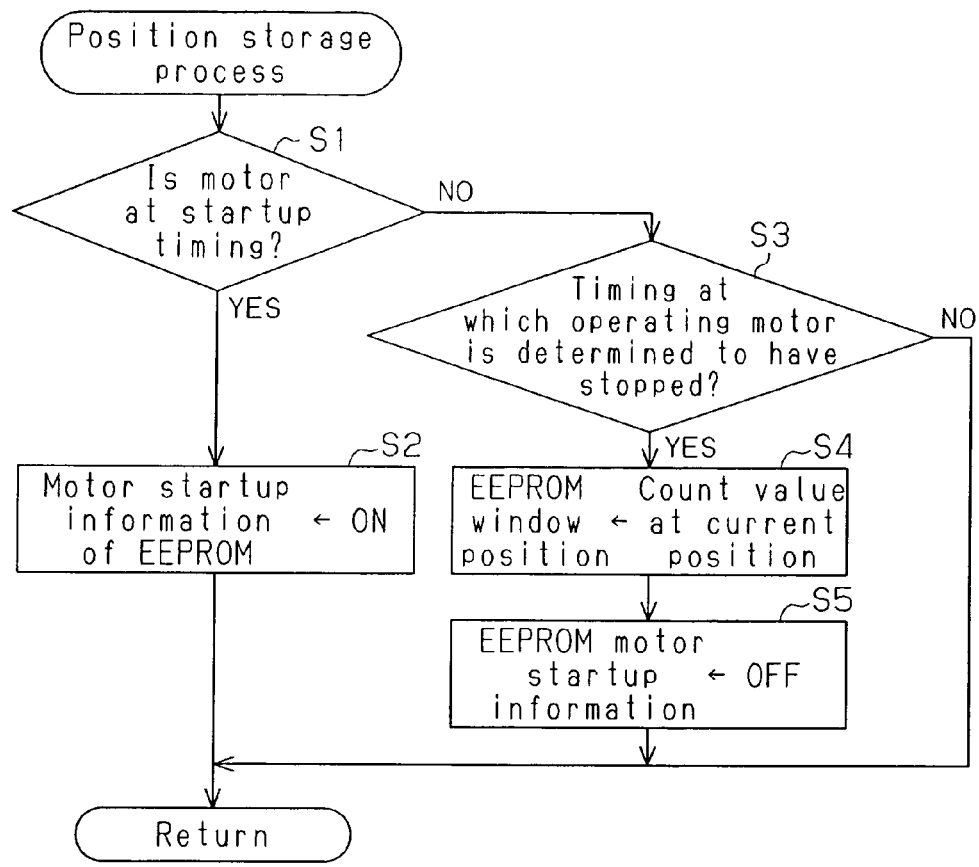
FIG. 3 is a flow chart illustrating a position storage process of a controller.
Figure 4:
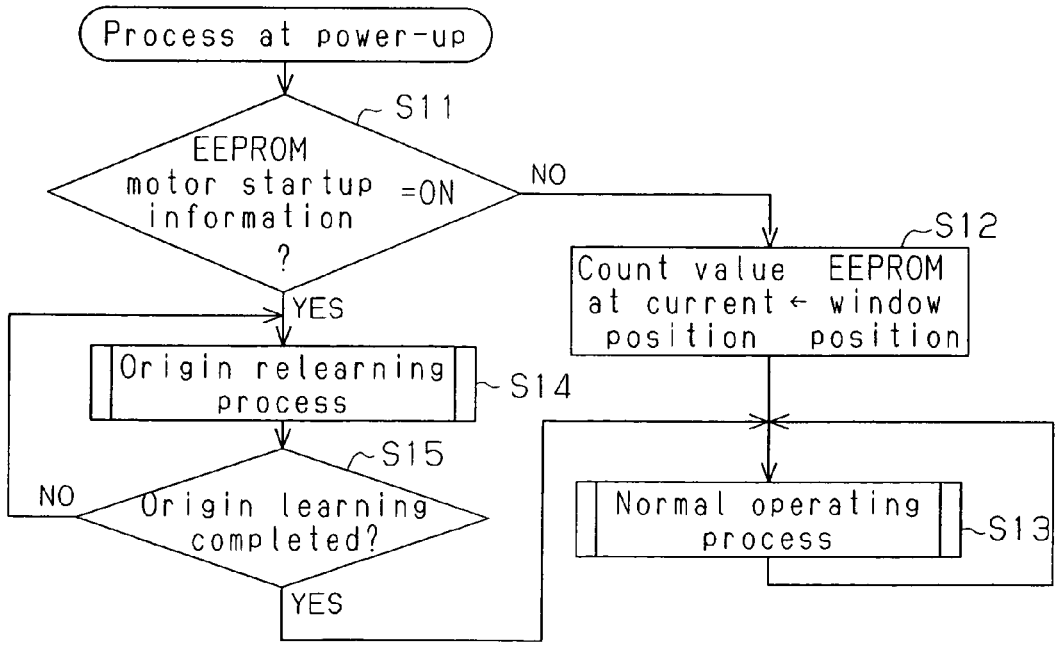
FIG. 4 is a flow chart illustrating a process at power-up of the controller.

Next, the "position storage process" of the controller 3 will be explained with reference to the flow chart shown in FIG. 3 and the timing chart shown in FIG. 5 and the "process at power-up" will be explained according to the flow chart shown in FIG. 4.

"Position Storage Process"

This position storage process is carried out at predetermined time intervals of, for example, 3 ms. In step S1, the controller 3 determines whether the drive motor 2 is at the startup timing or not. Here, the drive circuit 4 is provided with a relay 4a which is switched to supply power to the drive motor 2 or stop the power supply to the drive motor 2 and the controller 3 determines whether the drive motor 2 has shifted from the halt state to the operating state based on the ON/OFF state of the relay 4a. When it is determined that the drive motor 2 is at the startup timing, that is, it is determined based on the ON state of the relay 4a that the drive motor 2 has shifted from the halt state to the operating state, the controller 3 moves to step S2.

In step S2, the controller 3 writes data indicating an ON state into the EEPROM 3a as the startup information of the drive motor 2 and ends the process. When it is determined in above step S1 that the drive motor 2 is not at the startup timing, that is, it is determined that the drive motor 2 has not shifted from the halt state to the operating state, the controller 3 moves to step S3.

In step S3, the controller 3 determines whether it is a timing at which it is determined that the operating drive motor 2 has stopped or not. When it is determined that it is the timing at which the drive motor 2 has stopped, or more specifically, it is determined that a predetermined time t1 has elapsed (see FIG. 5) after the relay 4a turned OFF and the drive motor 2 has shifted from the operating state to the halt state, the controller 3 moves to step S4. Even if the relay 4a is turned OFF and the power supply to the drive motor 2 is stopped, the drive motor 2 continues to operate by inertia although for a very short time. Therefore, the predetermined time t1 is set to a time enough for the drive motor 2 to be considered to be fully stopped and a count value corresponding to the accurate position of the window glass 11 is written into the EEPROM 3a.

In step S4, the controller 3 writes the count value indicating the current position of the window glass 11 into the EEPROM 3a and moves to step S5. In step S5, the controller 3 writes data indicating an OFF state into the EEPROM 3a as the startup information of the drive motor 2 and ends the process.

When it is determined in the above step S3 that it is not at the timing at which the drive motor 2 is determined to have stopped, or more specifically, when it is determined that the drive motor 2 is in operation or in a halt state and that the drive motor 2 has not shifted from the operating state to the halt state, the controller 3 ends the process. The position storage process shown in these steps S1 to S5 is repeated at predetermined time intervals.

Figure 5:
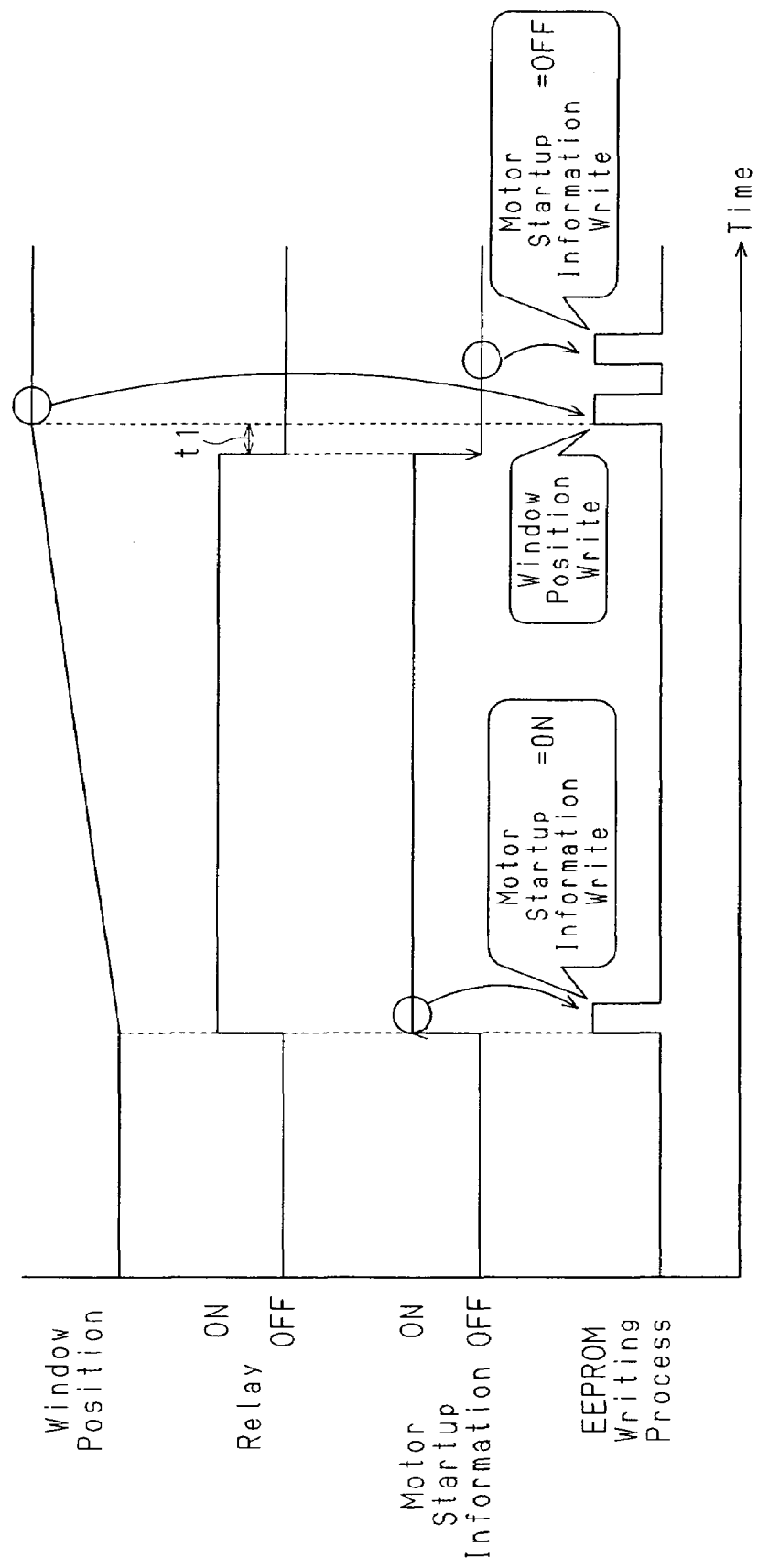
FIG. 5 is a timing chart illustrating the position storage process.

That is, the controller 3 writes data indicating an ON state into the EEPROM 3a as the startup information of the drive motor 2 at a timing at which the drive motor 2 shifts from the halt state to the operating state as shown in FIG. 5. Furthermore, the controller 3 writes the count value indicating the current position of the window glass 11 into the EEPROM 3a at a timing at which the drive motor 2 shifts from the operating state to the halt state after a lapse of a predetermined time t1 after the relay 4a turns OFF. After the writing, the controller 3 writes data indicating an OFF state into the EEPROM 3a as the startup information of the drive motor 2.

"Process at Power-Up"

This process at power-up is carried out when the power supply to the controller 3 is started, for example, when power is turned ON. In step S11, the controller 3 determines whether the startup information of the drive motor 2 written in the EEPROM 3a is data indicating an ON state or not. When it is determined that the startup information of the drive motor 2 written in the EEPROM 3a is not the data indicating an ON state, that is, when it is determined that the startup information is data indicating an OFF state, the controller 3 moves to step S12.

In step S12, the controller 3 acquires the window position stored in the EEPROM 3a as a count value indicating the current position of the window glass 11 and moves to step S13.

In step S13, the controller 3 shifts to a normal operation processing mode in which a normal operation process of the window glass 11 is carried out according to the operation of the window switch 5. That is, that it is determined in step S11 that the startup information of the drive motor 2 written in the EEPROM 3a is not data indicating an ON state, that is, it is determined that the startup information is data indicating an OFF state and means that the drive motor 2 was in a halt state when the power supply to the controller 3 was stopped. Therefore, since the current position of the window glass 11 matches the position of the window glass 11 corresponding to the count value written in the EEPROM 3a, the controller 3 determines that the current position of the window glass 11 is correctly identified and there is no need to perform relearning of the origin position. This causes the controller 3 to shift to a normal operation processing mode in which the normal operation process of the window glass 11 according to the operation of the window switch 5 is performed.

When it is determined in step S11 that the startup information of the drive motor 2 written in the EEPROM 3a is data indicating an ON state, the controller 3 moves to step S14.

In step S14, the controller 3 shifts to an origin position relearning process mode. That is, that it is determined in step S11 that the startup information of the drive motor 2 written in the EEPROM 3a is data indicating an ON state means that the drive motor 2 was in operation when the power supply to the controller 3 was stopped. Therefore, the current position of the actual window glass 11 has moved from the position of the window glass 11 corresponding to the count value written in the EEPROM 3a and the current position of the window glass 11 differs from the position of the window glass 11 corresponding to the count value written in the EEPROM 3a. For this reason, the controller 3 misidentifies the current position of the window glass 11 and causes trouble with the control of the drive motor 2, and therefore the controller 3 determines that it is necessary to perform relearning of the origin position. Once this determination is made, as described above, the controller 3 shifts to an inching mode, which prompts the passenger (operator) to perform relearning of the origin position. Then, the controller 3 moves to step S15.

In step S15, the controller 3 determines whether the relearning of the origin position has ended or not. The relearning of the origin position, as described above, is performed by operating the window glass 11 up to a fully closed mechanical limit position, operating the window switch 5 and resetting the count value corresponding to the position of the window glass 11 to "0". Then, if this relearning of the origin position has not ended, the controller 3 returns to step S14. That is, the controller 3 remains in the origin position relearning mode, that is, inching mode until the relearning of the origin position ends.

On the other hand, if the relearning of the origin position ends in step S15, the controller 3 moves to step S13 and shifts to a normal operation processing mode in which a normal operation process of the window glass 11 according to the operation of the window switch 5 is performed. Therefore, if an ON state of the drive motor 2 has been written in the EEPROM 3a by carrying out the process at power-up when the power supply to the controller 3 is started, the controller 3 operates so as to perform relearning of the origin position. On the other hand, if an OFF state of the drive motor 2 has been written in the EEPROM 3a when the power supply to the controller 3 is started, the controller 3 operates so as to perform a normal operation process. That is, relearning of the origin position is performed only when it is necessary and the frequency with which relearning of the origin position, which is a complicated operation, is reduced.

Next, characteristic operation effects of this embodiment will be explained.

(1) Based on halting of operation of the drive motor 2, that is, after a lapse of a predetermined time t1 after the relay 4a is turned OFF, the controller 3 writes the position information (count value) of the window glass 11 into the EEPROM 3a. Furthermore, based on the count value written in the EEPROM 3a at the start of power supply, the controller 3 identifies the current position of the window glass 11 and controls the drive motor 2. The controller 3 determines whether the current position of the window glass 11 is lost at the start of the power supply or not. Then, only when it is determined that the controller 3 has lost the current position of the window glass 11, the controller 3 moves to the origin position relearning mode. For this reason, it is possible to reduce the frequency with which relearning of the origin position, which is a complicated operation, is performed.

(2) Based on the halting of operation of the drive motor 2, the controller 3 writes the fact that the drive motor 2 is in a halt state into the EEPROM 3a. Furthermore, based on the start of operation of the drive motor 2, that is, based on the ON state of the relay 4a, the controller 3 writes into the EEPROM 3a the fact that the drive motor 2 is in an operating state. When the fact that the drive motor 2 is in an operating state has been written in the EEPROM 3a at the start of power supply, the controller 3 determines that the current position of the window glass 11 has been lost. That is, since the drive motor 2 is in operation when the power supply to the controller 3 is stopped, the current position of the actual window glass 11 has moved from the position of the window glass 11 corresponding to the count value written in the EEPROM 3a. Therefore, the current position of the window glass 11 is different from the position of the window glass 11 corresponding to the count value written in the EEPROM 3a. Therefore, by writing into the EEPROM 3a the fact that the drive motor 2 is placed in a halt state based on the halting of operation of the drive motor 2 and writing the fact that the drive motor 2 is placed in an operating state based on the start of operation of the drive motor 2, it is possible to easily determine at the start of power supply whether the controller 3 has lost the current position of the window glass 11 or not.

(3) After a lapse of a predetermined time t1 after the relay 4a is turned OFF and power supply to the drive motor 2 is stopped until it is determined that the drive motor 2 has halted completely, the controller 3 writes the position information (count value) of the window glass 11 into the EEPROM 3a. That is, even if the power supply to the drive motor 2 itself is stopped, the drive motor 2 continues to operate by inertia although for a very short time, and therefore writing the count value into the EEPROM 3a after a lapse of the predetermined t1 allows an accurate count value to be written into the EEPROM 3a. Therefore, it is possible to prevent operation mistakes in the controller 3.

(4) When the controller 3 determines at the start of power supply that the current position of the window glass 11 has been lost, the controller 3 shifts to a mode in which relearning of the origin position is performed. Therefore, it is possible to allow the passenger (operator) to perform relearning of the origin position as early as possible and more reliably.

(5) After writing the position information (count value) of the window glass 11 into the EEPROM 3a, the controller 3 writes an OFF state for the drive motor 2. For this reason, if the power supply is stopped when the position information of the window glass 11 is being written into the EEPROM 3a, the OFF state of the drive motor 2 has not been written, and therefore it is possible to determine that the written position information may not be correct. Therefore, it is possible to allow the passenger (operator), etc., to perform relearning of the origin position as early as possible and more reliably.

Hereinafter, a second embodiment which embodies the present invention in a power window apparatus for a vehicle will be explained according to the drawings. This embodiment is slightly different from the first embodiment only in the "position storage process" and "process at power-up" of the controller 3. Therefore, mainly these processes will be explained below.

To identify the current position of the actual window glass 11, the controller 3 writes the count value (position information) corresponding to the current position of the window glass 11 into the EEPROM 3a provided inside the controller 3. The controller 3 writes this count value at a timing at which the drive motor 2 shifts from an operating state to a halt state. Furthermore, the controller 3 erases the current position of the window glass 11 written in the EEPROM 3a at the timing at which the drive motor 2 shifts from a halt state to an operating state. The process of writing these count values into the EEPROM 3a will be referred to as the "position storage process."

When the power supply to the controller 3 itself is started, for example, when power is turned ON or when the battery 7 is replaced, the controller 3 reads the count value written in the EEPROM 3a and recognizes the current position of the window glass 11. In this case, the controller 3 determines whether or not to perform relearning of the origin position depending on the presence/absence of this count value. That is, when the count value indicating the position of the window glass 11 has been written in the EEPROM 3a, the controller 3 determines that it is not necessary to perform relearning of the origin position and when the count value has not been written in the EEPROM 3a, the controller 3 determines that it is necessary to perform relearning of the origin position. The process of determining whether or not to perform relearning of the origin position when power is turned ON will be referred to as the "process at power-up."

More specifically, that the position of the window glass 11 has not been written in the EEPROM 3a when the power supply to the controller 3 is started means that the drive motor 2 was in operation when the power supply to the controller 3 was stopped. In this case, the controller 3 cannot acquire the current position of the actual window glass 11, that is, the controller 3 has lost the current position of the window glass 11. This would cause trouble with the control of the drive motor 2, and therefore the controller 3 shifts to an inching mode, which prompts the passenger (operator) to perform relearning of the origin position, that is, a mode in which the window glass 11 does not move by more than a predetermined amount (predetermined count value) by a single operation of the window switch 5.

On the other hand, if the position of the window glass 11 has been written in the EEPROM 3a when the power supply to the controller 3 is started, the controller 3 determines that the current position of the window glass 11 is accurately identified and there is no need to perform relearning of the origin position. Thus, the controller 3 shifts to a normal operation processing mode in which a normal operation process on the window glass 11 is performed according to the operation of the window switch 5.

Figure 6:
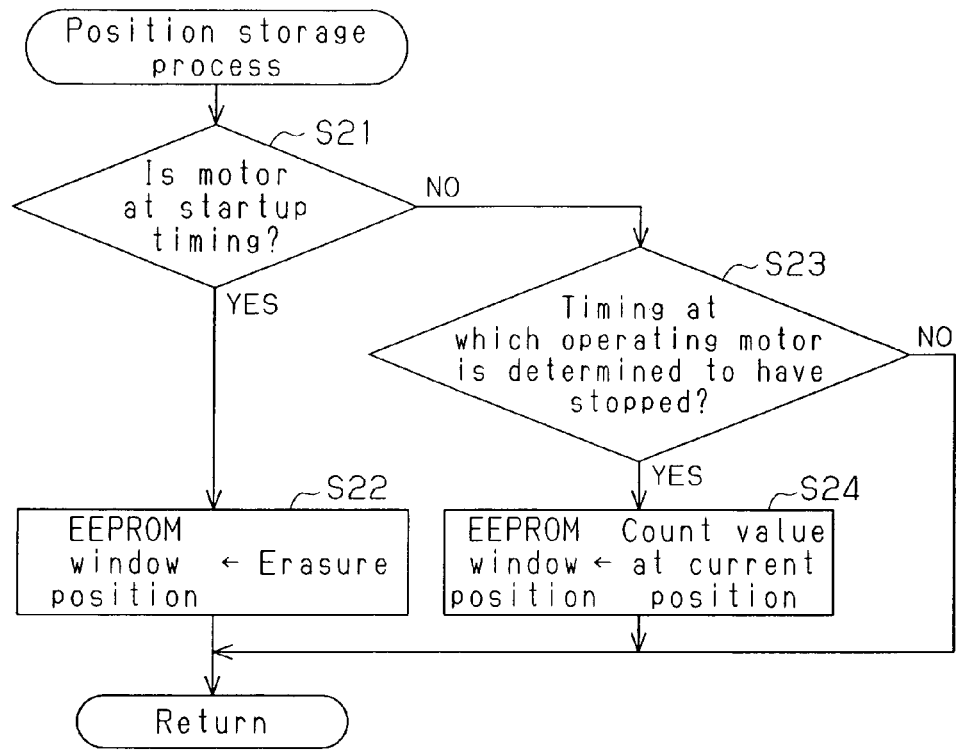
FIG. 6 is a flow chart illustrating a position storage process of a controller according to a second embodiment.
Figure 7:
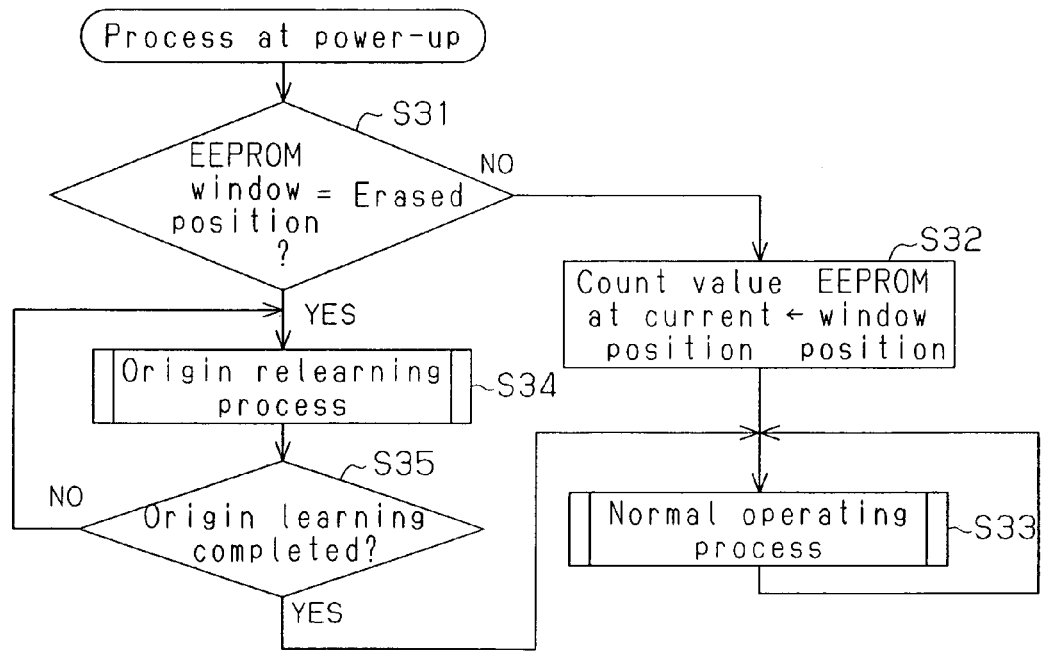
FIG. 7 is a flow chart illustrating a process at power-up of the controller.

Next, the "position storage process" of the controller 3 will be explained with reference to the flow chart shown in FIG. 6 and the timing chart shown in FIG. 8 and the "process at power-up" will be explained according to the flow chart shown in FIG. 7.

"Position Storage Process"

This position storage process is carried out at predetermined time intervals of, for example, 3 ms. In step S21, the controller 3 determines whether the drive motor 2 is at the startup timing or not. The controller 3 determines whether the drive motor 2 has shifted from a halt state to an operating state or not based on the ON/OFF state of the relay 4a in the drive circuit 4. If the controller 3 determines that the drive motor 2 is at the startup timing, that is, the controller 3 determines that the drive motor 2 has shifted from a halt state to an operating state based on the ON state of the relay 4a, the controller 3 moves to step S22.

In step S22, the controller 3 erases the count value indicating the position of the window glass 11 written in the EEPROM 3a and ends the process. When it is determined in the above step S21 that drive motor 2 is not at the startup timing, that is, it is determined that the drive motor 2 has not shifted from the halt state to the operating state, the controller 3 moves to step S23.

In step S23, the controller 3 determines whether it is the timing at which the operating drive motor 2 is determined to have halted or not. When the controller 3 determines that it is the timing at which the operating drive motor 2 is determined to have halted, or more specifically when the controller 3 determines that a predetermined time t1 has elapsed after the relay 4a has turned OFF (see FIG. 8) and that the drive motor 2 has shifted from an operating state to a halt state, the controller 3 moves to step S24.

In step S24, the controller 3 writes the count value indicating the current position of the window glass 11 into the EEPROM 3a and ends the process. When it is determined in the above step S23 that it is not the timing at which the drive motor 2 has halted, or more specifically when it is determined that the drive motor 2 is in operation or in a halt state and that the drive motor 2 has not shifted from an operating state to a halt state, the controller 3 ends the process. Then, the position storage process shown in these steps S21 to S24 is repeated at predetermined time intervals as described above.

Figure 8:
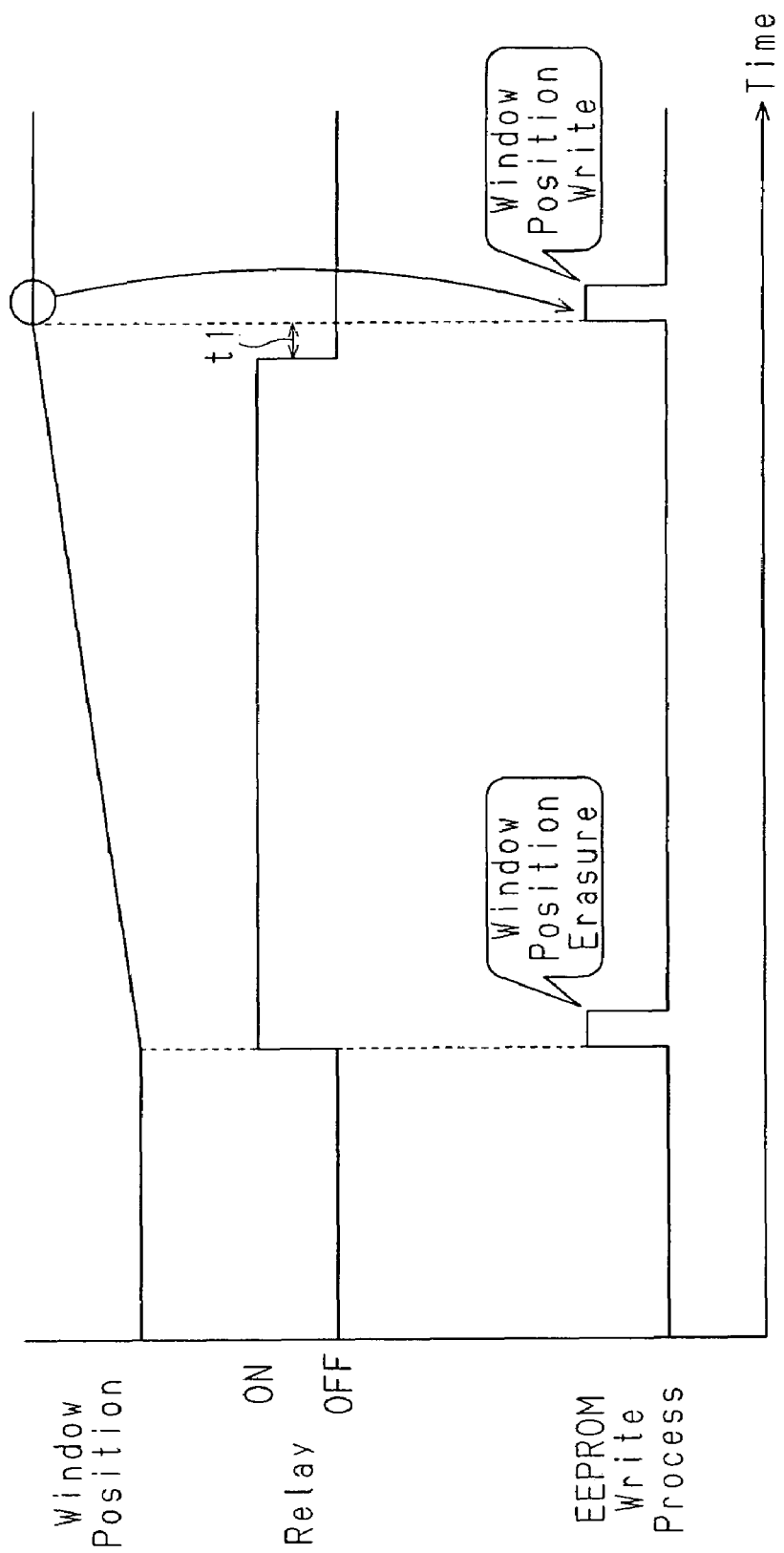
FIG. 8 is a timing chart illustrating the position storage process.

That is, as shown in FIG. 8, the controller 3 erases the count value written in the EEPROM 3a at the timing at which the drive motor 2 shifts from a halt state to an operating state. Furthermore, the controller 3 writes the count value indicating the current position of the window glass 11 into the EEPROM 3a at the timing at which the drive motor 2 shifts from the operating state to halt state after a lapse of a predetermined time t1 after the relay 4a has turned OFF.

"Process at Power-Up"

This process at power-up is carried out when the power supply to the controller 3 is started, for example, when power is turned ON. In step S31, the controller 3 determines whether the count value indicating the position of the window glass 11 has been erased from the EEPROM 3a or not. If it is determined that the count value has not been erased from the EEPROM 3a, that is, when it is determined that the count value has been written in the EEPROM 3a, the controller 3 moves to step S32.

In step S32, the controller 3 acquires the window position stored in the EEPROM 3a as the current count value indicating the current position of the window glass 11 and moves to step S33. In step S33, the controller 3 shifts to a normal operation processing mode in which a normal operation process of the window glass 11 is performed according to the operation of the window switch 5. That is, in above step S31, if the count value is written in the EEPROM 3a, the controller 3 identifies the current position of the window glass 11 correctly and determines that there is no need to perform relearning of the origin position. This causes the controller 3 to shift to a normal operation processing mode in which a normal operation process of the window glass 11 is performed according to the operation of the window switch 5.

If it is determined in the above step S31 that the count value has been erased from EEPROM 3a, the controller 3 moves to step S34. In step S34, the controller 3 shifts to an origin position relearning process mode. That is, if the count value has been erased from the EEPROM 3a in above step S31, the controller 3 naturally cannot identify the current position of the window glass 11 and loses the current position of the window glass 11, causing trouble with the control of the drive motor 2. Therefore, the controller 3 determines that it is necessary to perform relearning of the origin position. Once this decision is made, as described above, the controller 3 shifts to an inching mode, which prompts the passenger (operator) to perform relearning of the origin position. Then, the controller 3 moves to step S35.

In step S35, the controller 3 determines whether relearning of the origin position has ended or not and if the relearning of the origin position has not ended, the controller 3 returns to step S34. That is, the controller 3 remains in the origin position relearning process mode, that is, the inching mode until the relearning of the origin position ends. On the other hand, when the relearning of the origin position in step S35 ends, the controller 3 moves to above step S33 and shifts to a normal operation processing mode in which a normal operation process is carried out on the window glass 11 according to the operation of the window switch 5.

Therefore, even in this embodiment that carries out a process at power-up, as in the case of the first embodiment, relearning of the origin position is performed only when required, and it is possible to reduce the frequency with which relearning of the origin position, which is a complicated operation, is performed.

Next, characteristic operation effects of this embodiment will be explained. The power window apparatus 1 for a vehicle of this embodiment has operation effects similar to the operation effects (1), (3) and (4) of the first embodiment. The following are operation effects different from those of the above described first embodiment.

(1) Based on halting of operation of the drive motor 2, that is, after a lapse of a predetermined time t1 after the relay 4a has turned OFF, the controller 3 writes the position information (count value) of the window glass 11 into the EEPROM 3a. Furthermore, based on the start of operation of the drive motor 2, that is, based on the ON state of the relay 4a, the controller 3 erases the count value written in the EEPROM 3a. When the count value has not been written in the EEPROM 3a when the power supply is started, the controller 3 determines that the current position of the window glass 11 has been lost. That is, when the count value is written into the EEPROM 3a based on the halting of operation of the drive motor 2 as described above, the timing of erasing the count value means that the drive motor 2 was in operation when the power supply to the controller 3 was stopped. For this reason, even if the count value is written into the EEPROM 3a without erasing it, the current position of the actual window glass 11 has shifted from the position of the window glass 11 corresponding to the count value written in the EEPROM 3a. Therefore, the current position of the window glass 11 is different from the position of the window glass 11 corresponding to the count value written in the EEPROM 3a. Therefore, by writing the count value into the EEPROM 3a based on the halting of operation of the drive motor 2 and erasing the count value written in the EEPROM 3a based on the start of operation of the drive motor 2, the controller 3 can easily determine whether the current position of the window glass 11 has been lost or not at the start of power supply.

(2) The controller 3 writes the count value into the EEPROM 3a based on the halting of operation of the drive motor 2 and erases the count value written in the EEPROM 3a based on the start of operation of the drive motor 2. Therefore, it is possible to reduce the amount of data by the data corresponding to the startup information of the drive motor 2 compared to the first embodiment which writes the startup information of the drive motor 2 into the EEPROM 3a.

Hereinafter, a third embodiment which embodies the present invention in a power window apparatus for a vehicle will be explained according to the drawings. This embodiment is slightly different from the first embodiment only in the "position storage process" and "process at power-up" of the controller 3. Therefore, mainly these processes will be explained below.

To identify the current position of the actual window glass 11, the controller 3 writes the count value (position information) corresponding to the position of the window glass 11 into the EEPROM 3a provided inside the controller 3 at least twice. The controller 3 writes this count value at the timing at which the drive motor 2 shifts from an operating state to a halt state and after a lapse of a predetermined time after that timing. Furthermore, the controller 3 writes position information outside a default range into the EEPROM 3a at the timing at which the drive motor 2 shifts from the halt state to the operating state. The process of writing these count values into the EEPROM 3a will be referred to as "position storage process." The above described default range is a range within which the window glass 11 can move.

When the power supply to the controller 3 itself is started, for example, when power is turned ON or when the battery 7 is replaced, the controller 3 reads a plurality of pieces of position information written in the EEPROM 3a and recognizes the current position of the window glass 11. In this case, the controller 3 determines whether or not to perform relearning of the origin position depending on whether the plurality of pieces of position information match or not and whether these pieces of position information are within the default range or not. That is, the controller 3 determines that there is no need to perform relearning of the origin position if a plurality of pieces of position information written in the EEPROM 3a match one another and these pieces of position information are within the default range, whereas when the plurality of pieces of position information written in the EEPROM 3a do not match one another or these pieces of position information are outside the default range, the controller 3 determines that it is necessary to perform relearning of the origin position. The process of determining whether relearning of the origin position is performed or not when power is turned ON will be referred to as the "process at power-up."

More specifically, that the plurality of pieces of position information written in the EEPROM 3a do not match one another or these pieces of position information are outside the default range when the power supply to the controller 3 is started means that the drive motor 2 was in operation or in the process of halting when the power supply to the controller 3 was stopped. In this case, the controller 3 cannot acquire the current position of the window glass 11, that is, the controller 3 has lost the current position of the window glass 11. This would cause trouble with the control of the drive motor 2, and therefore the controller 3 shifts to an inching mode, which prompts the passenger (operator) to perform relearning of the origin position, that is, a mode in which the window glass 11 will not operate more than a predetermined amount (predetermined count value) by a single operation of the window switch 5.

On the other hand, when the power supply to the controller 3 is started, if a plurality of pieces of position information written in the EEPROM 3a match one another and these pieces of position information (value) are within the default range, the halting process has normally ended. Therefore, the controller 3 can acquire the position information that matches the current position of the window glass 11, and therefore the controller 3 determines that there is no need to perform relearning of the origin position. This causes the controller 3 to shift to a normal operation processing mode in which a normal operation process of the window glass 11 is performed according to the operation of the window switch 5.

Figure 9:
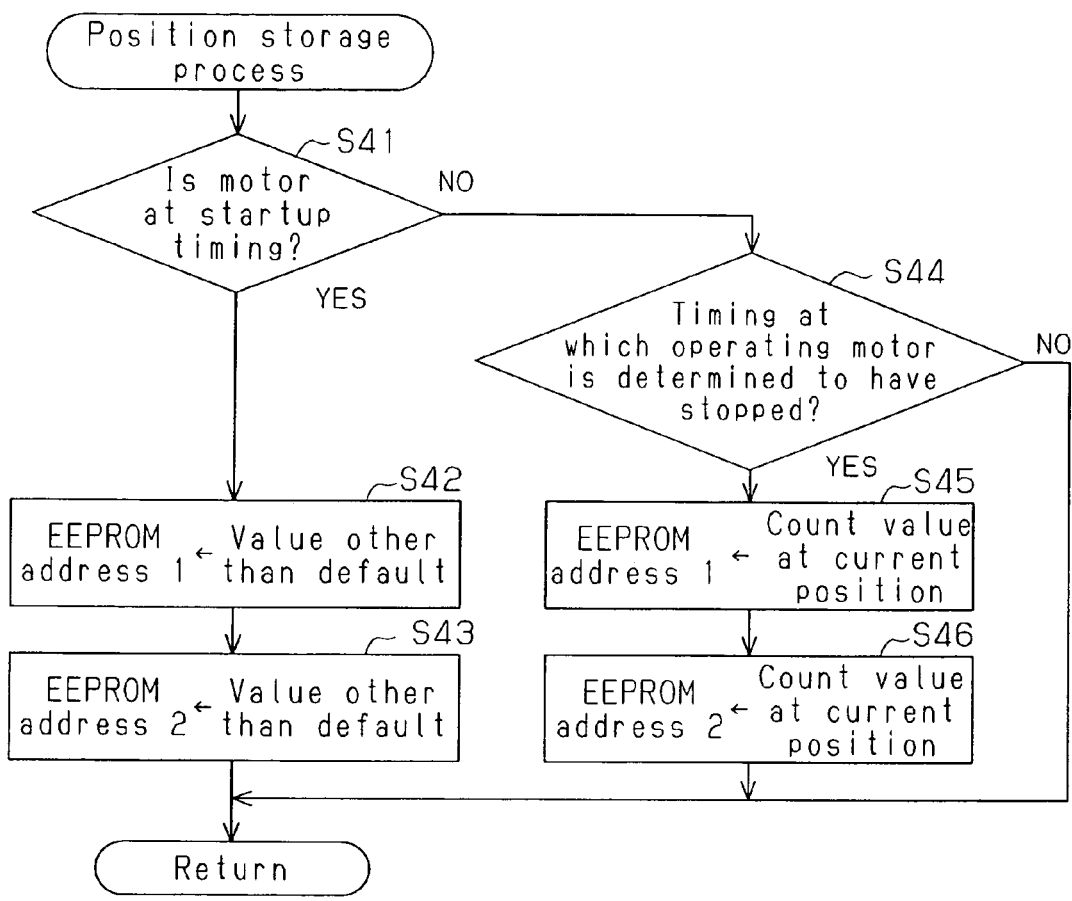
FIG. 9 is a flow chart illustrating a position storage process of a controller according to a third embodiment.
Figure 10:
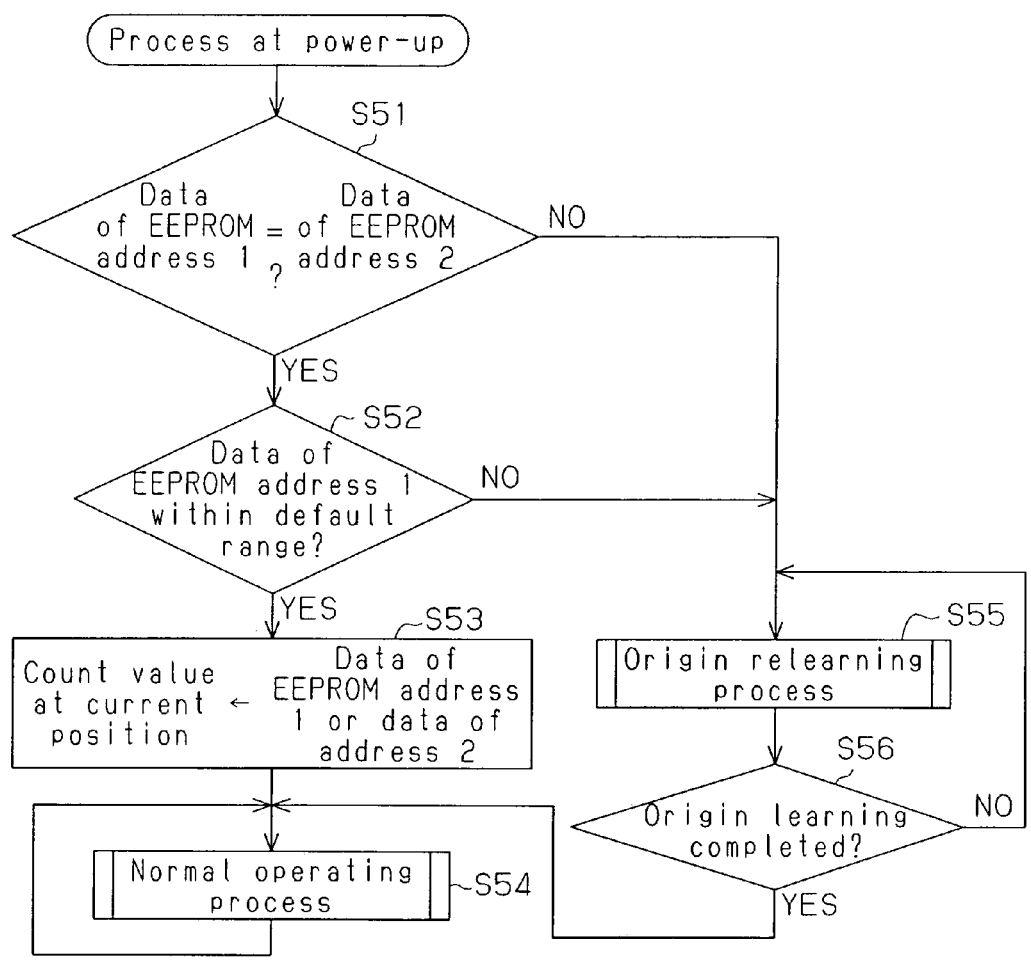
FIG. 10 is a flow chart illustrating the process at power-up of the controller.

Next, the "position storage process" of the controller 3 will be explained with reference to the flow chart shown in FIG. 9 and the timing chart shown in FIG. 11 and the "process at power-up" will be explained according to the flow chart shown in FIG. 10. FIG. 9 and FIG. 10 are flow charts showing a case where two pieces of position information are written into the EEPROM 3a.

"Position Storage Process"

This position storage process is performed at predetermined time intervals of, for example, 3 ms. In step S41, the controller 3 determines whether the drive motor 2 is at the startup timing or not. Based on the ON/OFF state of the relay 4a in the drive circuit 4, the controller 3 determines whether the drive motor 2 has shifted from a halt state to an operating state or not. When it is determined that the drive motor 2 is at the startup timing, that is, it is determined that the drive motor 2 has shifted from the halt state to the operating state based on the ON state of the relay 4a, the controller 3 moves to step S42.

In step S42, the controller 3 writes a value outside the default range at a first address (address 1) of the EEPROM 3a. Next, in step S43, the controller 3 writes a value outside the default range at a second address (address 2) of the EEPROM 3a and ends the process. The values to be written at the first address and the value written at the second address may or may not match each other if they are values at least outside the default range.

When it is determined in the above step S41 that the drive motor 2 is not at the startup timing, that is, it is determined that the drive motor 2 has not shifted from a halt state to an operating state, the controller 3 moves to step S44. In step S44, the controller 3 determines whether it is the timing at which the drive motor 2 is determined to have halted or not. When it is determined that it is the timing at which the drive motor 2 is determined to have halted, or more specifically, when it is determined that a predetermined time t1 has elapsed after the relay 4a has turned OFF (see FIG. 11) and the drive motor 2 has shifted from an operating state to a halt state, the controller 3 moves to step S45.

In step S45, the controller 3 writes the count value (position information) indicating the current position of the window glass 11 at the first address of the EEPROM 3a. Next, in step S46, the controller 3 writes the count value (position information) indicating the current position of the window glass 11 at the second address of the EEPROM 3a and ends the process.

In above step S44, when it is determined that it is not the timing at which the drive motor 2 is determined to have halted, or more specifically, when it is determined that the drive motor 2 is in operation or in a halt state and that the drive motor 2 has not shifted from an operating state to a halt state, the controller 3 ends the process. Then, the position storage process shown in these steps S41 to S46 is carried out repeatedly at predetermined time intervals as described above.

That is, as shown in FIG. 11, the controller 3 writes a plurality of values outside the default range into the EEPROM 3a at timings at which the drive motor 2 shifts from a halt state to an operating state. Furthermore, the controller 3 writes the count value indicating the current position of the window glass 11 into the EEPROM 3a at a timing at which the drive motor 2 has shifted from an operating state to a halt state after a lapse of a predetermined time t1 after the relay 4a has turned OFF.

"Process at Power-Up"

This process at power-up is performed when the power supply to the controller 3 is started, for example, when power is turned ON. In step S51, the controller 3 compares data (position information) stored at the first address (address 1) of the EEPROM 3a with the data (position information) stored at the second address (address 2) of the EEPROM 3a. When the data at the first address matches the data at the second address, the controller 3 moves to step S52.

In step S52, the controller 3 determines whether the data stored at the first address (address 1) of the EEPROM 3a is within a default range or not, and if the data is within the default range, the controller 3 moves to step S53. In step S53, the controller 3 acquires the data at address 1 or data at address 2 of the EEPROM 3a as a count value indicating the current position of the window glass 11 and moves to step S54.

In step S54, the controller 3 shifts to a normal operation processing mode in which a normal operation process on the window glass 11 is carried out according to the operation of the window switch 5. That is, in above step S51, when the data stored at a plurality of addresses of the EEPROM 3a match and in step S52 when the data at address 1 is within the default range, the controller 3 can acquire the current position of the window glass 11 from the EEPROM 3a, and therefore the controller 3 determines that there is no need to perform relearning of the origin position. In this way, the controller 3 shifts to a normal operation processing mode in which a normal operation process on the window glass 11 is performed according to the operation of the window switch 5.

In contrast, in above step S51, when the data at the first address does not match the data at the second address, the controller 3 moves to step S55. Furthermore, in above step S52, when the data stored at the first address (address 1) of the EEPROM 3a is outside the default range, the controller 3 moves to step S55.

In step S55, the controller 3 shifts to the origin position relearning process mode. That is, in the above step S51, when the data at address 1 does not match the data at address 2 or in step S52 when the data at address 1 is outside the default range, the controller 3 naturally cannot acquire the current position of the window glass 11, loses the current position of the window glass 11, which causes trouble with the control of the drive motor 2. For this reason, the controller 3 determines that it is necessary to perform relearning of the origin position. Once this decision is made, as described above, the controller 3 shifts to an inching mode which prompts the passenger (operator) to perform relearning of the origin position. Then, the controller 3 moves to step S56.

In step S56, the controller 3 determines whether the relearning of the origin position has ended or not and if relearning of the origin position has not ended, the controller 3 returns to step S55. That is, the controller 3 remains in the origin position relearning process mode, that is, inching mode until relearning of the origin position ends. On the other hand, if relearning of the origin position ends in step S56, the controller 3 moves to step S54 and shifts to a normal operation processing mode in which a normal operation process on the window glass 11 is carried out according to the operation of the window switch 5.

Therefore, even in this embodiment that carries out such process at power-up as in the case of the first embodiment and second embodiment, relearning of the origin position is performed only when required and the frequency with which relearning of the origin position, which is a complicated operation, is reduced.

Next, characteristic operation effects of this embodiment will be explained. The power window apparatus 1 for a vehicle in this embodiment has operation effects similar to the operation effects (1), (3) and (4) of the first embodiment.

The following are operation effects different from those of the above described first embodiment.

(1) Based on halting of operation of the drive motor 2, that is, after a lapse of a predetermined time t1 after the relay 4*a* is turned OFF, the controller 3 writes a plurality of pieces of position information (count values) of the window glass 11 into the EEPROM 3*a*. Furthermore, based on the start of operation of the drive motor 2, that is, the ON state of the relay 4*a*, the controller 3 writes a plurality of count values outside the default range into the EEPROM 3*a*. Then, when power is turned ON, the controller 3 determines whether a plurality of count values match or these count values fall within the default range or not. When the plurality of pieces of position information do not match one another or the position information is outside the default range, the controller 3 determines that the current position of the window glass 11 has been lost. That is, writing the plurality of count values into the EEPROM 3*a* based on the halting of operation of the drive motor 2 as described above means that the drive motor 2 was in operation when power supply to the controller 3 was stopped. Therefore, writing the plurality of count values into the EEPROM 3*a* based on the halting of operation of the drive motor 2 allows the controller 3 to easily determine whether the current position of the window glass 11 has been lost or not when the power supply is started.

(2) Based on the halting of operation of the drive motor 2, the controller 3 writes a plurality of count values into the EEPROM 3*a* and writes a plurality of values outside the default range into the EEPROM 3*a* based on the start of operation of the drive motor 2. That is, when power supply to the controller 3 is stopped when a plurality of count values are written, a plurality of data pieces differ from one another. Therefore, it is possible to determine that the power supply has stopped when position information is being written into the EEPROM 3*a*. That is, it is possible to reliably determine whether the "position storage process" has ended or not.

The embodiments of the present invention may also be changed as follows:

It is determined whether the controller 3 has lost the current position of the window glass 11 or not based on the startup information of the drive motor 2 written into the EEPROM 3*a* in the first embodiment and based on the presence/absence of the position information (count value) of the window glass 11 written into the EEPROM 3*a* in the second embodiment, but the determination is not limited to this and can be changed as appropriate.

In the above embodiments, the controller 3 detects the halt state and operating state of the drive motor 2 based on the ON/OFF state of the relay 4*a*, but it is also possible to detect the halt state and operating state of the drive motor 2 using anything other than the relay 4*a*. For example, the halt state and operating state of the drive motor 2 may also be detected based on a pulse signal synchronized with the rotation of the drive motor 2 output from the rotation detection apparatus 6. Moreover, when a power transistor is used instead of the relay 4*a*, the halt state and operating state of the drive motor 2 may be detected based on the ON/OFF state of the transistor.

The above described embodiments use the EEPROM 3*a* as an electrically rewritable ROM, but other electrically rewritable ROMs such as a flash memory may also be used.

The above described embodiments are applied to the power window apparatus 1 for a vehicle whose open/close member is the window glass 11, but it is also possible to apply the present invention to a sunroof apparatus whose open/close member is a sunroof or a slide door opening and closing apparatus whose open/close member is a slide door. Furthermore, the present invention can also be applied to an opening and closing control apparatus other than that for a vehicle.

In the first embodiment above, any information can be written into the EEPROM 3*a* if it can at least distinguish between a halt state and operating state. For example, it is possible to write "ON" when operation is started and write "OFF" when operation is stopped. Or it is possible to write information when operation is started and erase the information when operation is stopped. Or it is also possible to write information when operation is stopped and erase the information when operation is started.

Embodiments of the present invention have been explained in association with the attached drawings, but the present invention is not limited to this and can also be modified within the scope of the attached claims and equivalents.

What is claimed is:

1. A control apparatus for an open/close member, in which the apparatus controls opening and closing of the open/close member, comprising:
    a drive motor driven so as to open and close the open/close member;
    position detection means for detecting the position of the open/close member;
    storage means made of an electrically rewritable ROM into which position information corresponding to the position of the detected open/close member is written;
    control means for writing current position information of the open/close member into the storage means based on halting of operation of the drive motor and identifying the current position of the open/close member when power supply is started based on the position information of the open/close member written in the storage means; and
    determination means for determining whether the control means has lost the current position of the open/close member or not at the start of the power supply.

2. The control apparatus for an open/close member according to claim 1, wherein the control means writes first information indicating a halt state of the drive motor into the storage means based on the halting of operation of the drive motor and writes second information indicating an operating state of the drive motor into the storage means based on the start of operation of the drive motor, and
    when the second information is written in the storage means at the start of the power supply, the determination means determines that the control means has lost the current position of the open/close member.

3. The control apparatus for an open/close member according to claim 2, wherein the control means writes first information into the storage means after writing the position information of the open/close member.

4. The control apparatus for an open/close member according to claim 1, wherein the control means writes the current position information of the open/close member into the storage means based on the halting of operation of the drive motor, erases the position information of the open/close member written in the storage means based on the start of operation of the drive motor, and
    when the position information of the open/close member is not written in the storage means at the start of the power supply, the determination means determines that the control means has lost the current position of the open/close member.

5. The control apparatus for an open/close member according to claim 1, wherein when the operation of the drive motor is halted and when a predetermined time has elapsed after the halting of operation, the control means writes the current position information of the open/close member into the storage means at least twice and writes the position information outside a default range indicating an allowable opening and closing operation range of the open/close member into the storage means based on the start of operation of the drive motor, and when the position information written in the storage means matches at least twice at the start of the power supply and the position information is within the default range, the determination means determines that the control means identifies the current position of the open/close member correctly.

6. The control apparatus for an open/close member according to claim 1, wherein after a lapse of a predetermined time after a power supply to the drive motor is stopped until the drive motor is considered to stop completely, the control means writes the current position information of the open/close member into the storage means.

7. The control apparatus for an open/close member according to claim 1, wherein the determination means determines at the start of the power supply that the control means has lost the current position of the open/close member, the determination means performs relearning of the origin position which matches the position of the open/close member with the position of the open/close member corresponding to the position information of the open/close member written in the storage means.

8. A method for controlling an open/close member, in which the method controls opening and closing of the open/close member, comprising:

writing position information corresponding to a detected position of the open/close member into storage means made of an electrically rewritable ROM based on the halting of operation of a drive motor which opens and closes the open/close member;

identifying the current position of the open/close member by control means at the start of power supply based on the current position information of the open/close member written in the storage means; and determining at the start of the power supply that the control means has lost the current position of the open/close member or not.

9. The method for controlling an open/close member according to claim 8, wherein in the writing into the storage means, first information indicating a halt state of the drive motor is written into the storage means based on the halting of operation of the drive motor and second information indicating an operating state of the drive motor is written into the storage means based on the start of operation of the drive motor, and in the determining whether the current position of the open/close member has been lost or not, when the second information is written in the storage means at the start of the power supply, it is determined that the control means has lost the current position of the open/close member.

10. The method for controlling an open/close member according to claim 9, wherein in the writing into the storage means, first information is written into the storage means after writing the position information of the open/close member.

11. The method for controlling an open/close member according to claim 8, wherein in the writing into the storage means, the current position information of the open/close member is written into the storage means based on the halting of operation of the drive motor and the position information of the open/close member written in the storage means is erased based on the start of operation of the drive motor, and in the determining whether the current position of the open/close member has been lost or not, when the position information of the open/close member is not written in the storage means at the start of the power supply, it is determined that the control means has lost the current position of the open/close member.

12. The method for controlling an open/close member according to claim 8, wherein in the writing into the storage means, when the operation of the drive motor is stopped and when a predetermined time has elapsed after the halting of operation, the current position information of the open/close member is written into the storage means at least twice and the position information outside a default range indicating an allowable opening and closing operation range of the open/close member is written into the storage means based on the start of operation of the drive motor, and in the determining whether the current position of the open/close member has been lost or not, when the position information written in the storage means matches at least twice at the start of the power supply and the position information is within the default range, the determination means determines that the control means identifies the current position of the open/close member correctly.

13. The method for controlling an open/close member according to claim 8, wherein in the writing into the storage means, after a lapse of a predetermined time after power supply to the drive motor is stopped until the drive motor is considered to stop completely, the current position information of the open/close member is written into the storage means.

14. The method for controlling an open/close member according to claim 8, further comprising:

performing relearning of the origin position which matches the position of the open/close member with the position of the open/close member corresponding to the position information of the open/close member written in the storage means when it is determined at the start of the power supply that the control means has lost the current position of the open/close member.

15. A control apparatus for an open/close member, in which the apparatus controls opening and closing of the open/close member, comprising:

a drive motor driven so as to open and close the open/close member;

position detection apparatus for detecting the position of the open/close member;

an electrically rewritable ROM into which position information corresponding to the position of the detected open/close member is written;

a controller for writing current position information of an open/close member into the ROM based on halting of operation of the drive motor, identifying the current position of the open/close member when power supply is started based on the position information of the open/close member written in the ROM and determining whether the current position of the open/close member has been lost or not at the start of the power supply.

16. The control apparatus for an open/close member according to claim 15, wherein the controller writes first information indicating a halt state of the drive motor into the ROM based on the halting of operation of the drive motor and writes second information indicating an operating state of the drive motor into the ROM based on the start of operation of the drive motor, and when the second information is written in the ROM at the start of the power supply, the controller determines that the current position of the open/close member has been lost.

17. The control apparatus for an open/close member according to claim 16, wherein the controller writes first information into the ROM after writing the position information of the open/close member.

18. The control apparatus for an open/close member according to claim 15, wherein the controller writes the current position information of the open/close member into the ROM based on the halting of operation of the drive motor, erases the position information of the open/close member written in the ROM based on the start of operation of the drive motor, and when the position information of the open/close member is not written in the ROM at the start of the power supply, the controller determines that the current position of the open/close member has been lost.

19. The control apparatus for an open/close member according to claim 15, wherein when the operation of the drive motor is halted and when a predetermined time has elapsed after the halting of operation, the controller writes the current position information of the open/close member into the ROM at least twice and writes the position information outside a default range indicating an allowable opening and closing operation range of the open/close member into the ROM based on the start of operation of the drive motor, and when the position information written in the ROM matches at least twice at the start of the power supply and the position information is within the default range, the controller determines that the current position of the open/close member is correctly identified.

20. The control apparatus for an open/close member according to claim 15, wherein after a lapse of a predetermined time after a power supply to the drive motor is stopped until the drive motor is considered to stop completely, the controller writes the current position information of the open/close member into the ROM.

21. The control apparatus for an open/close member according to claim 15, wherein when the controller determines at the start of the power supply that the current position of the open/close member has been lost, the controller performs relearning of the origin position which matches the position of the open/close member with the position of the open/close member corresponding to the position information of the open/close member written in the ROM.

22. A method for controlling an open/close member, in which the method controls opening and closing of the open/close member, comprising:

writing position information corresponding to a detected position of the open/close member into an electrically rewritable ROM based on the halting of operation of a drive motor which opens and closes the open/close member;

identifying the current position of the open/close member with a controller at the start of power supply based on the current position information of the open/close member written in the ROM; and determining at the start of the power supply that the controller has lost the current position of the open/close member or not.

23. The method for controlling an open/close member according to claim 22, wherein in the writing into the ROM, first information indicating a halt state of the drive motor is written into the ROM based on the halting of operation of the drive motor and second information indicating an operating state of the drive motor is written into the ROM based on the start of operation of the drive motor, and in the determining whether the current position of the open/close member has been lost or not, when the second information is written in the ROM at the start of the power supply, it is determined that the controller has lost the current position of the open/close member.

24. The method for controlling an open/close member according to claim 23, wherein in the writing into the ROM, first information is written into the ROM after writing the position information of the open/close member.

25. The method for controlling an open/close member according to claim 22, wherein in the writing into the ROM, the current position information of the open/close member is written into the ROM based on the halting of operation of the drive motor and the position information of the open/close member written in the ROM is erased based on the start of the operation of the drive motor, and in the determining whether the current position of the open/close member has been lost or not, when the position information of the open/close member is not written in the ROM at the start of the power supply, it is determined that the controller has lost the current position of the open/close member.

26. The method for controlling an open/close member according to claim 22, wherein in the writing into the ROM, when the operation of the drive motor is stopped and when a predetermined time has elapsed after the halting of operation, the current position information of the open/close member is written into the ROM at least twice and the position information outside a default range indicating an allowable opening and closing operation range of the open/close member is written into the ROM based on the start of operation of the drive motor, and in the determining whether the current position of the open/close member has been lost or not, when the position information written in the ROM matches at least twice at the start of the power supply and the position information is within the default range, the controller determines that the current position of the open/close member is correctly identified.

27. The method for controlling an open/close member according to claim 22, wherein in the writing into the ROM, after a lapse of a predetermined time after power supply to the drive motor is stopped until the drive motor is considered to stop completely, the current position information of the open/close member is written into the ROM.

28. The method for controlling an open/close member according to claim 22, further comprising:

performing relearning of the origin position which matches the position of the open/close member with the position of the open/close member corresponding to the position information of the open/close member written in the ROM when it is determined at the start of the power supply that the controller has lost the current position of the open/close member.

* * * * *